(12) United States Patent
Jennas, II et al.

(10) Patent No.: US 8,548,949 B2
(45) Date of Patent: *Oct. 1, 2013

(54) METHODS FOR DYNAMIC CONSISTENCY GROUP FORMATION

(75) Inventors: Paul A. Jennas, II, Tucson, AZ (US);
Jason L. Peipelman, Vail, AZ (US);
Joshua M. Rhoades, Idaho Falls, ID (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/483,865

(22) Filed: May 30, 2012

(65) Prior Publication Data

US 2012/0239893 A1    Sep. 20, 2012

Related U.S. Application Data

(63) Continuation of application No. 12/892,808, filed on Sep. 28, 2010.

(51) Int. Cl.
*G06F 17/00* (2006.01)
(52) U.S. Cl.
USPC ............................ 707/649; 707/690; 707/803
(58) Field of Classification Search
USPC .......................................... 707/649, 690, 803
See application file for complete search history.

(56) References Cited

U.S. PATENT DOCUMENTS

| | | | |
|---|---|---|---|
| 5,487,562 A | | 1/1996 | Hedderly et al. |
| 5,603,024 A * | | 2/1997 | Goldring ...................... 707/615 |
| 6,112,257 A | | 8/2000 | Mason, Jr. et al. |
| 6,157,991 A * | | 12/2000 | Arnon ............................ 711/161 |
| 6,202,136 B1 * | | 3/2001 | Wikle et al. .................... 711/162 |
| 6,618,794 B1 * | | 9/2003 | Sicola et al. ................... 711/154 |
| 6,763,359 B2 | | 7/2004 | Lohman et al. |
| 7,296,008 B2 | | 11/2007 | Passerini et al. |
| 7,434,012 B1 | | 10/2008 | Ives et al. |
| 7,461,224 B2 | | 12/2008 | Kawamura et al. |
| 7,536,523 B2 | | 5/2009 | Yagawa et al. |
| 7,571,268 B2 | | 8/2009 | Kern et al. |
| 7,702,871 B1 | | 4/2010 | Arnon et al. |
| 7,721,055 B2 | | 5/2010 | Saika |
| 2005/0108298 A1 * | | 5/2005 | Iyengar et al. ................ 707/201 |

(Continued)

OTHER PUBLICATIONS

Clayton, N., "Global Mirror Whitepaper," IBM Corporation 2008, Sep. 15, 2008, pp. 1-30.

(Continued)

*Primary Examiner* — John E Breene
*Assistant Examiner* — Andalib Lodhi
(74) *Attorney, Agent, or Firm* — Zilka-Kotab, PC

(57) ABSTRACT

A method for dynamic consistency group formation, in one embodiment, includes creating a snapshot of first data stored on a source storage system with respect to data content and data structure, copying the snapshot to a target storage system, detecting one or more write operations affecting data on the source storage system while copying the first data, detecting one or more collisions affecting the first data on the source storage system, wherein a collision occurs whenever the write operations affect the first data prior to the first data being written, setting a consistency group interval which represents an interval duration between successive snapshot create-and-copy events, and altering the consistency group interval to minimize collisions affecting data on at least one of the storage systems. Other methods for dynamic consistency group formation are also described.

6 Claims, 8 Drawing Sheets

(56) References Cited

U.S. PATENT DOCUMENTS

| | | | |
|---|---|---|---|
| 2006/0106860 A1* | 5/2006 | Dee et al. .................. 707/102 |
| 2008/0016300 A1 | 1/2008 | Yim et al. |
| 2009/0106603 A1 | 4/2009 | Dilman et al. |
| 2011/0320412 A1 | 12/2011 | Hanson |
| 2012/0078848 A1 | 3/2012 | Jennas, II et al. |

OTHER PUBLICATIONS

Non-Final Office Action from U.S. Appl. No. 12/892,808 dated Oct. 12, 2012.

* cited by examiner

METHODS FOR DYNAMIC CONSISTENCY GROUP FORMATION

RELATED APPLICATIONS

This application is a continuation of copending U.S. patent application Ser. No. 12/892,808, filed Sep. 28, 2010, which is herein incorporated by reference.

BACKGROUND

The present invention relates to data storage systems, and more particularly, this invention relates to a method for dynamic consistency group formation in a storage system.

A possible and continuing goal in the data storage industry is that of data consistency, which has become a focal feature of modern data storage systems. The continuing benefit for increasing consistency has spawned an industry dedicated to providing storage solutions to enterprise customers with huge storage capacity and stringent data consistency requirements.

Data stored on a source storage system and a target storage system should be consistent with respect to both data content and data structure. As such, data are typically migrated to the target storage system in the same order as they were written to the source storage system. Since migration of data to the target storage system often occurs concurrent to writing the data to the source storage system or using the data on the source storage system, events occur where data being written is simultaneously being accessed and/or changed on another system, known as collisions. These collisions dictate that the migration to the target storage system wait for completion of the corresponding write operation to the source storage system, resulting in unacceptable latency during write and migrate operations.

In an increasingly global economy, where business often occurs internationally and storage needs span the globe, increased latency affects the performance and viability of storage systems, particularly when considering that the distance between the source storage system and the target storage system, which is quite common in the global economy, greatly amplifies the latency experienced during a given collision.

Current state-of-the-art techniques employ several approaches to provide users with an acceptable consistency within storage systems, including symmetrical (synchronous) solutions and asymmetrical (asynchronous) solutions.

Symmetrical storage solutions copy data written to a source storage system from the source storage system to a target storage system, and then copy the data back to the source storage system. This solution guarantees consistency among the source data and target data, but also results in collisions. Therefore, symmetrical storage solutions suffer from latency that detracts from data accessibility and inhibits or even prohibits deployment of the storage solutions in practice.

Asymmetrical storage solutions copy data from a source storage system to a target storage system, which may be recovered on demand. Asymmetrical storage solutions do not suffer from collisions as frequently as symmetrical solutions, since the data transmission is unidirectional, but neither can they guarantee consistency, especially with regard to data structure. Therefore, asymmetrical storage solutions are inadequate to meet current industry data consistency needs.

Therefore, a method for ensuring consistency of data between a source storage system and a target storage system that minimizes latency caused by collisions would find great utility and benefit in the data storage industry.

BRIEF SUMMARY

In one embodiment, a method for dynamic consistency group formation includes: creating a snapshot of first data stored on a source storage system, wherein the snapshot is a logical copy of the first data stored on the source storage system with respect to data content and data structure; copying the snapshot to a target storage system; copying the first data represented by the snapshot from the source storage system to the target storage system; detecting one or more write operations affecting data on the source storage system; detecting one or more collisions affecting the first data on the source storage system, wherein a collision occurs whenever the one or more write operations affect at least a portion of the first data prior to the at least a portion of the first data being written to the target storage system; setting a consistency group interval, wherein the consistency group interval represents an interval duration between successive snapshot create-and-copy events; and altering the consistency group interval to minimize collisions affecting data on at least one of the storage systems.

Other aspects and embodiments of the present invention will become apparent from the following detailed description, which, when taken in conjunction with the drawings, illustrate by way of example the principles of the invention.

DETAILED DESCRIPTION

Figure 1:
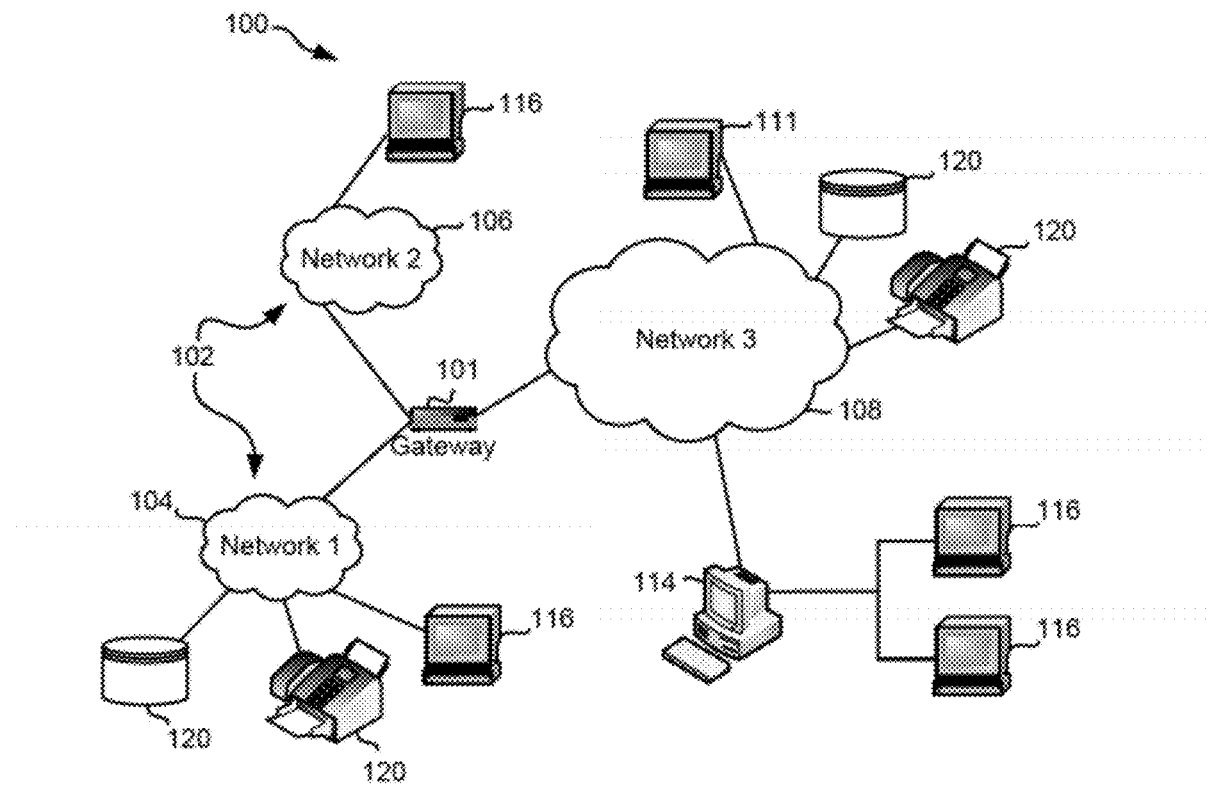
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It may also be noted that, as used in the specification and the appended claims, the singular forms "a," "an," and "the" include plural referents unless otherwise specified.

The following description discloses several preferred embodiments of storage systems, as well as operation and/or component parts thereof.

In one general embodiment, a method for dynamic consistency group formation includes: creating a snapshot of first data stored on a source storage system, wherein the snapshot is a logical copy of the first data stored on the source storage system with respect to data content and data structure; copying the snapshot to a target storage system; measuring a latency of one or more performed operations on at least one of the storage systems, wherein the latency is a period of time required to perforin the one or more operations; copying the first data represented by the snapshot from the source storage system to the target storage system; detecting one or more write operations affecting data on the source storage system; detecting one or more collisions affecting the first data on the source storage system, wherein a collision occurs whenever the one or more write operations affect at least a portion of the first data prior to the at least a portion of the first data being written to the target storage system; setting a consistency group interval, wherein the consistency group interval represents an interval duration between successive snapshot create-and-copy events; and altering the consistency group interval to minimize collisions affecting data on at least one of the storage systems.

In another general embodiment, a system includes: logic for creating a snapshot of first data stored on a source storage system, wherein the snapshot is a logical copy of the first data stored on the source storage system with respect to data content and data structure; logic for copying the snapshot to a target storage system; logic for measuring a latency of one or more performed operations on at least one of the storage systems, wherein the latency is a period of time required to perform the one or more operations; logic for copying the first data represented by the snapshot from the source storage system to the target storage system; logic for detecting one or more write operations affecting data on the source storage system; logic for detecting one or more collisions affecting the first data on the source storage system, wherein a collision occurs whenever the one or more write operations affect at least a portion of the first data prior to the at least a portion of the first data being written to the target storage system; logic for setting a consistency group interval, wherein the consistency group interval represents an interval duration between successive snapshot create-and-copy events; and logic for altering the consistency group interval to minimize collisions affecting data on at least one of the storage systems.

In yet another general embodiment, a computer program product for optimizing dynamic consistency group formation includes: a computer readable storage medium having computer readable program code embodied therewith, the computer readable program code comprising: computer readable program code configured to create a snapshot of first data stored on a source storage system, wherein the snapshot is a logical copy of the first data stored on the source storage system with respect to data content and data structure; computer readable program code configured to copy the snapshot to a target storage system; computer readable program code configured to measure a latency of performing one or more operations on at least one of the storage systems, wherein the latency is a period of time required to perform the one or more operations; computer readable program code configured to copy the first data represented by the snapshot from the source storage system to the target storage system; computer readable program code configured to detect one or more write operations affecting data on the source storage system; computer readable program code configured to detect one or more collisions affecting the first data on the source storage system, wherein a collision occurs whenever the one or more write operations affect at least a portion of the first data prior to the at least a portion of the first data being written to the target storage system; computer readable program code configured to set a consistency group interval, wherein the consistency group interval represents an interval duration between successive snapshot create-and-copy events; and computer readable program code configured to alter the previously set consistency group interval to minimize collisions affecting data on at least one of the storage systems.

According to another general embodiment, a system includes: logic for creating a snapshot of first data stored on a source storage system, wherein the snapshot is a logical copy of the first data stored on the source storage system with respect to data content and data structure; logic for copying the snapshot to a target storage system; logic for measuring a latency of one or more performed operations on at least one of the storage systems, wherein the latency is a period of time required to perform the one or more operations; logic for copying the first data represented by the snapshot from the source storage system to the target storage system; logic for detecting one or more write operations affecting data on the source storage system; logic for detecting one or more collisions affecting the first data on the source storage system, wherein a collision occurs whenever the one or more write operations affect at least a portion of the first data prior to the first data being written to the target storage system; logic for setting a consistency group interval, wherein the consistency group interval represents an interval duration between successive snapshot create-and-copy events; and logic for altering the consistency group interval to minimize collisions affecting data on at least one of the storage systems, wherein the target storage system is remote from the source storage system, wherein the consistency group interval is altered to ensure that the latency does not exceed a maximum latency and is determined based on a either a maximum duration or a minimum duration between successive snapshot create-and-copy events, and wherein the latency is determined based on a value selected from a group consisting of: an absolute input-output (I/O) rate, a change in input-output (I/O) rate, an absolute number of collisions, and a rate of collisions per write operations.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
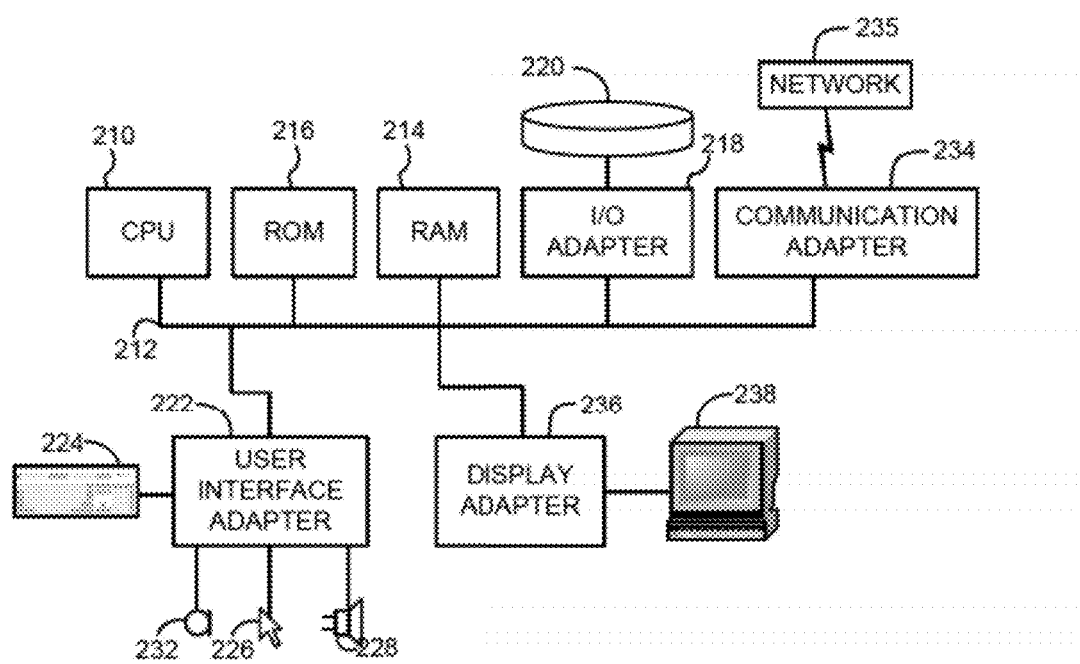
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I10 adapter 218 for connecting peripheral devices such as disk storage units 220 to the bus 212, a user interface adapter 222 for connecting a keyboard 224; a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

For any asynchronous replication function, there are three major functions to provide consistent mirroring of data: (1) creation of a consistent point across the replicated environment; (2) transmission of required updates to the secondary location; and (3) saving of consistent data to ensure a consistent image of the data is always available.

In one embodiment, the primary disk subsystems may provide functionality to co-ordinate the formation of consistency groups across all involved devices which are said to be in a storage system session. Fibre channel links provide low latency connections between multiple disk subsystems ensuring that this process involves negligible impact to the production applications. The consistency group information is held, preferably, in bitmaps rather than requiring the updates to be maintained in cache. However, any of method may be used with which to hold the consistency group information, according to various embodiments. These consistency groups are sent to the secondary location, possibly by using Global Copy (previously known as PPRC-XD), or the like.

According to some embodiments, a consistency group may include or be a snapshot.

Using Global Copy as generically used herein means that duplicate updates within the consistency group are not sent and that if the data sent is still in the cache on the primary disk subsystems, that only the changed blocks are sent. Once the consistency group has been sent to the secondary location, this consistent image of the primary data is saved using Flash-Copy. This ensures that there is always a consistent image of the primary data at the secondary location.

In one embodiment, consistency is provided in a similar fashion to FlashCopy consistency groups by using a data freeze, which preserves the order of dependant writes. This is in contrast to a storage system, which provides consistency using timestamps, and other solutions, which might provide consistency using sequence numbers. Using the data freeze concept allows the creation of consistency across multiple disk subsystems without requiring a common and extremely accurate time source like, the Sysplex Timer, in one illustrative embodiment.

Using the data freeze concept, consistency is obtained by temporarily inhibiting write I/O to the devices in an environment and then performing the actions required to create consistency. Once all devices have performed the required actions the write I/O is allowed to resume. This might include suspending devices in a Metro Mirror environment or performing a FlashCopy when using consistent FlashCopy. In one embodiment, this action may be the creation of the bitmaps for the consistency group, and the systems are able to create the consistent point quickly, e.g., in approximately 1 ms to 3 ins. Other solutions using a data freeze are not as highly optimized as those described herein. Therefore, though suitable, they might take longer to perform the consistency creation process. For example, creating a consistent FlashCopy might take an additional number of seconds depending on the size of the environment.

Figure 3:
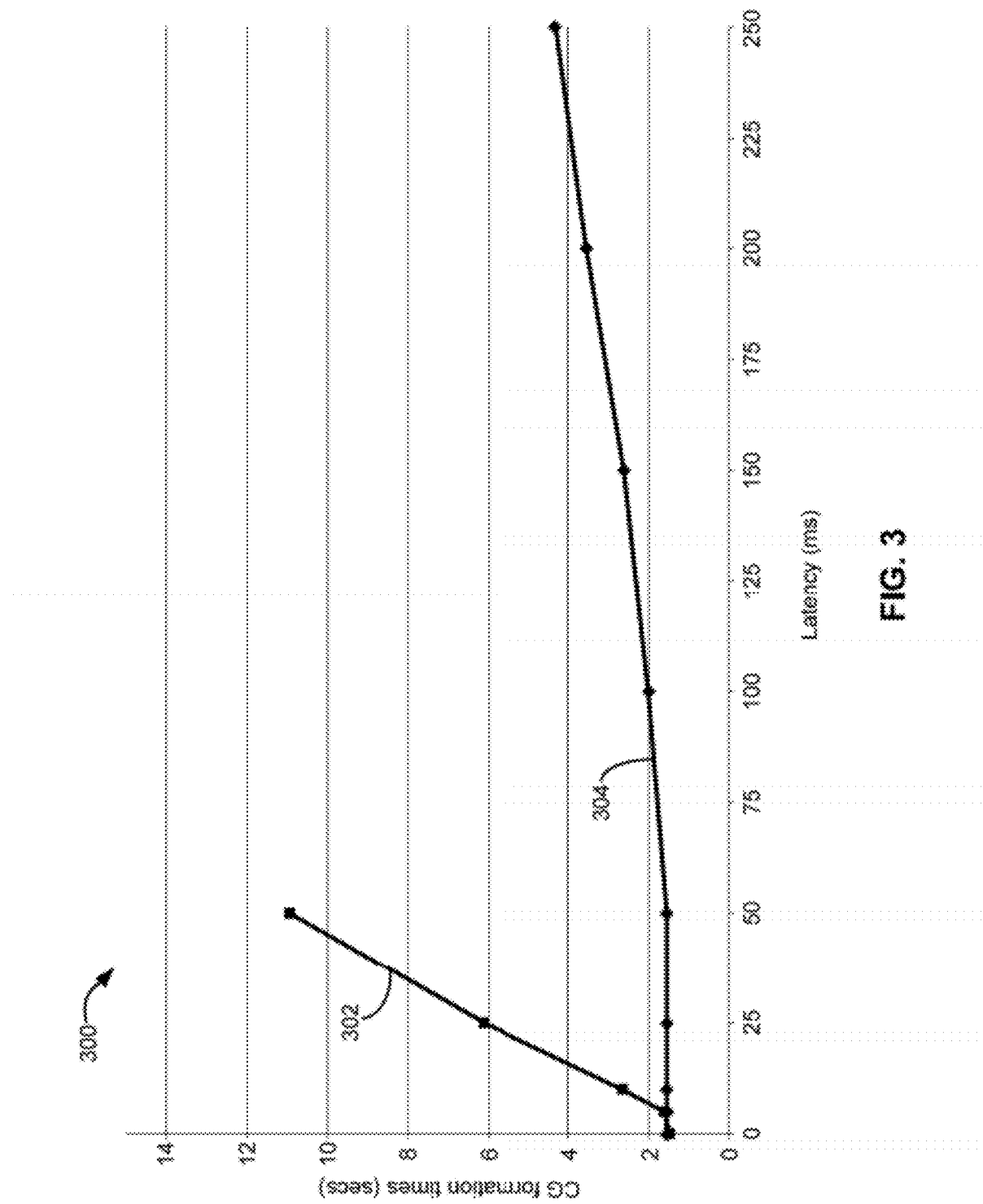
FIG. 3 is a graphical representation showing the relationship between latency and distance between storage systems, according to one embodiment.

Referring now to FIG. 3, a graphical representation of the relationship of distance between storage systems and latency 300 is shown, according to one embodiment. The two curves depicted in the graph depict the effect of distance on latency of write operations without utilizing consistency group (CG) interval optimization 302 and with consistency group interval optimization 304. The distance between storage systems is represented as the latency that is encountered due to collisions and other environmental effects, such as time that it takes for the data to be copied across ad through the wires and storage systems interconnecting the systems. It will be clear to one of skill in the art from FIG. 3 that determining a consistency group interval may mitigate the latency increases associated with increased distance between storage systems.

Figure 4:
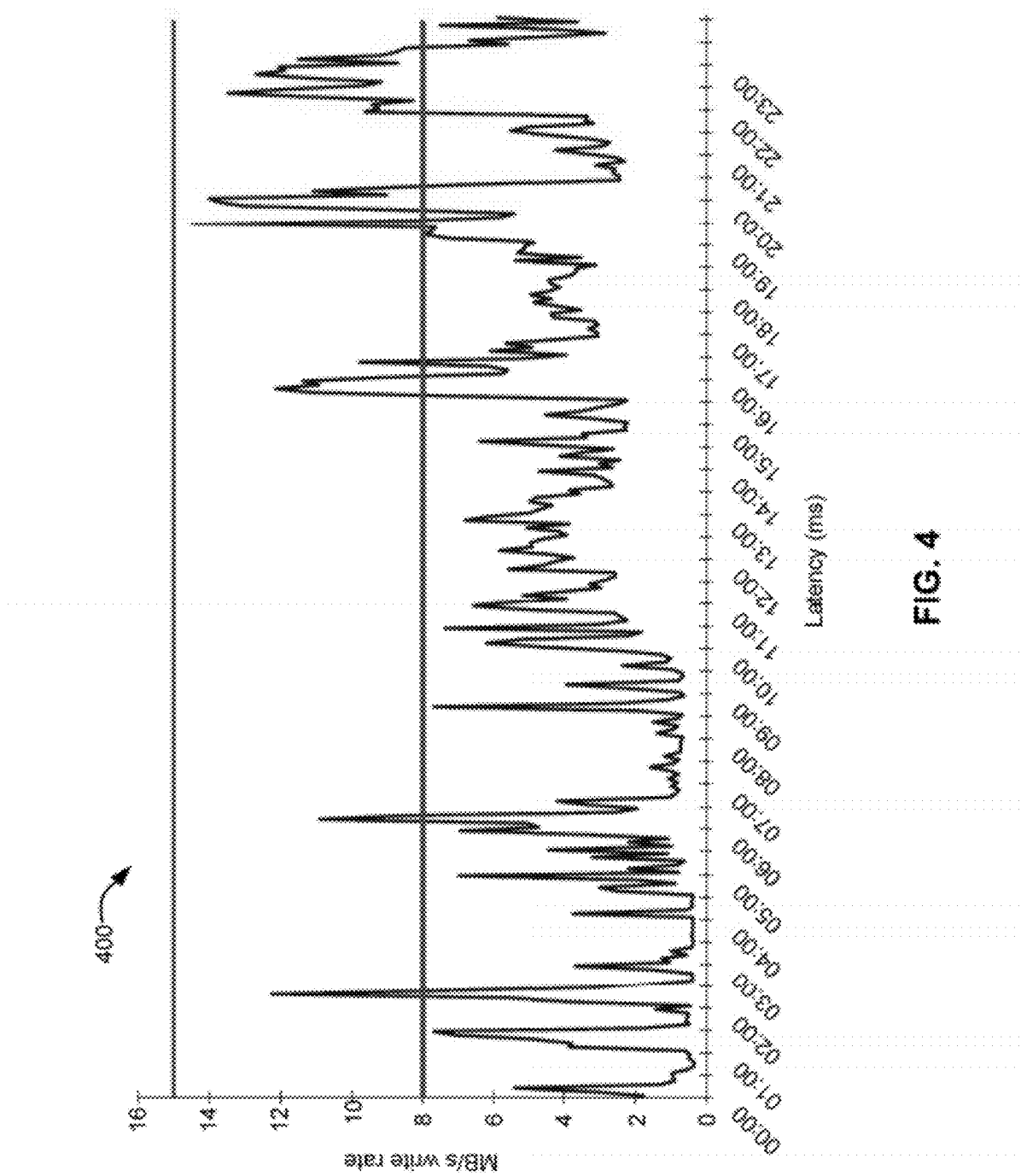
FIG. 4 is a graphical representation of the workload profile of a storage system over the course of a twenty-four hour period, according to one embodiment.

Referring now to FIG. 4, a graphical representation 400 of the workload profile of a typical storage system over the course of a twenty-four hour period is shown, according to one typical example. It will be clear to one of skill in the art from FIG. 4 that typical storage systems have a workload profile characterized by cyclical periods of high and low activity, which provides for opportunities in which consistency group formation can take place that will affect performance of the system less, e.g., during low activity periods.

In a preferred embodiment, less than peak bandwidth may be used during these non-peak times, with the ability to configure acceptance of a higher recovery point objective (RPO) at peak times. Many users have significant peaks in the write activities of their workloads, which may be 2-3 times higher than the average write throughput. These peaks are often at times where maintenance or batch activities are taking place and so there may not be sufficient justification to provide the bandwidth to maintain a very small RPO at these times. However, the activities that take place are likely to be time critical and so the production workload should not be significantly impacted if sufficient bandwidth is not available.

The process for forming consistency groups can be broken down conceptually into three steps: (1) create consistency group on primary disk subsystem; (2) send consistency group to secondary disk subsystem; and (3) save consistency group on secondary disk subsystem.

Figure 5:
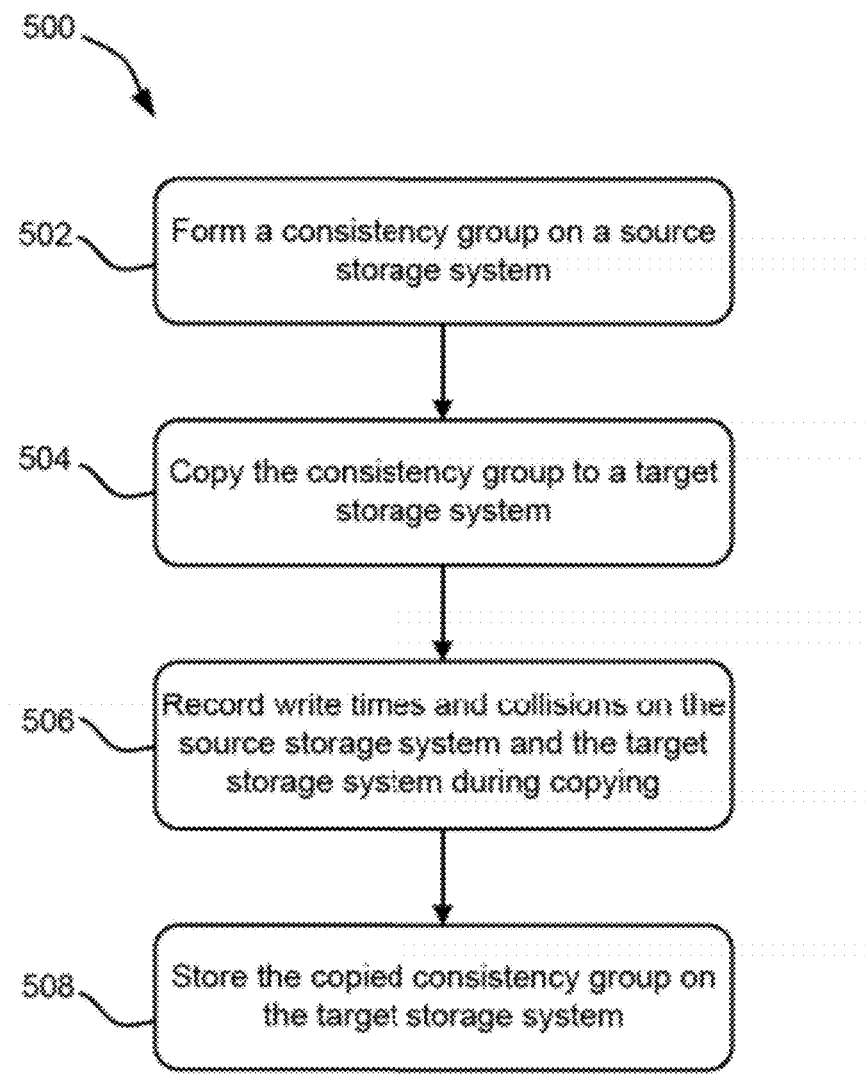
FIG. 5 shows a flowchart of a consistency group formation process on a symmetrical (synchronous) configuration, according to one embodiment.

Referring now to FIG. 5, a method 500 for forming a consistency group on an asymmetrical (asynchronous) configuration is shown, according to one embodiment. The method 500 may be carried out in any desired environment, such as those described in FIGS. 1-2, and many others, as would be known to one of skill in the art. In one preferred embodiment, the method 500 may be carried out by a storage system, such as a source storage system or a target storage system.

In operation 502, a consistency group is formed on a source storage system by holding application writes while creating a bitmap comprising updates for the consistency group being formed on all volumes within the source storage system. In a preferred embodiment, operation 502 may take about 2 ins to about 3 ins, and may have a maximum coordination time of about 50 ins, 60 ms, 70 ms, etc., according to some embodiments, after which the operation may be abandoned.

Subsequently, in operation 504, the consistency group (co-ordinated) is sent to a target storage system via a copy operation. In a preferred embodiment, operation 504 may have a maximum consistency group formation time, which forces the operation to be completed in less than a predetermined period of time, such as 1 minute, 30 seconds, 20 seconds, 10 seconds, etc., or else the operation may be abandoned. In some embodiments, the target storage system may be located at a site remote from the source storage system.

In one embodiment, if the maximum consistency group formation time is exceeded, then the storage system may determine how long it will take before another consistency group is expected to be formed, and may delay formation until it is possible to form consistency groups again. The production performance may be protected, but the RPO will be allowed to increase. In this way, the storage system maximizes the efficiency of the data transmission process by allowing duplicate updates to be sent and allowing all primary disk subsystems to send data independently. The storage system may check on a regular basis whether it is possible to start forming consistency groups and may do so as soon as it calculates that this is possible.

In one embodiment, the storage system may have three tunable values to modify its behavior. In most environments, default values may be preferred, as adjustments to these values may result in unexpected behavior.

In another embodiment, the maximum coordination time may be the maximum time that the storage system allows for the determination of a consistent set of data before failing this consistency group. Having this cut-off ensures that even if there is some error recovery event or communications problem, the production applications will not experience significant impact from consistency group formation. The default for the maximum co-ordination time may be 50 ms, which is a very small value compared to other I/O timeout values such MIH (30 seconds) or SCSI I/O timeouts. Hence, even in error situations where it is possible to trigger this timeout, the storage system may protect production performance rather than impacting production in an attempt to form consistency groups in a time where there might be error recovery or other problems occurring.

In yet another embodiment, the maximum consistency group formation time may be the maximum amount of time that the storage system spends forming a consistency group before failing the consistency group. If the maximum consistency group formation time is exceeded, then the storage system may transition to Global Copy mode for a period of time in order to catch up in the most efficient manner. While in Global Copy mode, the overheads may be lower than continually trying and failing to create consistency groups, and the previous consistency group will still be available on the C devices so the effect of this will simply be that the RPO increases for a short period.

The primary disk subsystem will evaluate when it would be able to continue to form consistency groups, and may restart consistency group formation at this time. The default for the maximum consistency group formation time may be some defined period, such as 30 seconds, which allows a reasonable time to send a consistency group while ensuring that if there is some non-fatal network or communications issue that the system do not wait too long before evaluating the situation and potentially dropping into Global Copy mode until the situation is resolved. In this way, the system again protect the production performance rather than attempting (and possibly failing) to form consistency groups at a time when this might not be appropriate. If the system is unable to form consistency groups for some suitable period, such as 30 minutes, by default, the storage system may form a consistency group without regard to the maximum consistency group formation time. In an alternative embodiment, it is possible to change this time if this behavior is not desirable in a particular environment.

In operation 506, application write operations and collisions are recorded in a separate bitmap for comparison to threshold values and adjacent cycles of copy operations. Operation 506 may be executed in concert with operation 504, in some approaches.

After a the system consistency group is formed, the number of collisions and writes are saved. The next consistency group formation will occur either at the maximum consistency group interval or the amount of time required to accumulate a number of application writes such that the number of acceptable collisions per write is achieved.

In our preferred implementation, the current collisions per write is calculated periodically during the consistency group formation using the following formula: current collisions per write=(num collisions during past CG formation)/(mum writes during past CG formation+num writes done since last CG formation). When it is detected that this ratio reaches the maximum impact specified by the user, or the maximum interval is reached, the next consistency group formation is started.

In alternative implementations, the design may also accept a minimum consistency group interval. If this is set, the CG formation may not occur until this interval has passed, even if the maximum consistency group formation impact is reached.

In alternative implementations, the acceptable collisions/write amount may be recalculated periodically using up to date average write times.

In another embodiment, ensuring an average count of collisions over a number of consistency group formation periods may be done instead of just calculating the number of writes needed until the next consistency group formation period is achieved by using just the previous consistency group formation period's collision count, which allows the algorithm to more smoothly handle cases in which a large isolated fluctuation in host writes during a given consistency group formation time causes undesirable wait times until the next consistency group formation cycle.

Finally, in operation 508, the copied consistency group is stored on the target storage system. This allows the consistency group to be retrieved at a future time. In one embodiment, future retrieval may be necessitated by, for example, a natural disaster at the source storage system site, destruction of data on the source storage system, etc.

Figure 6:
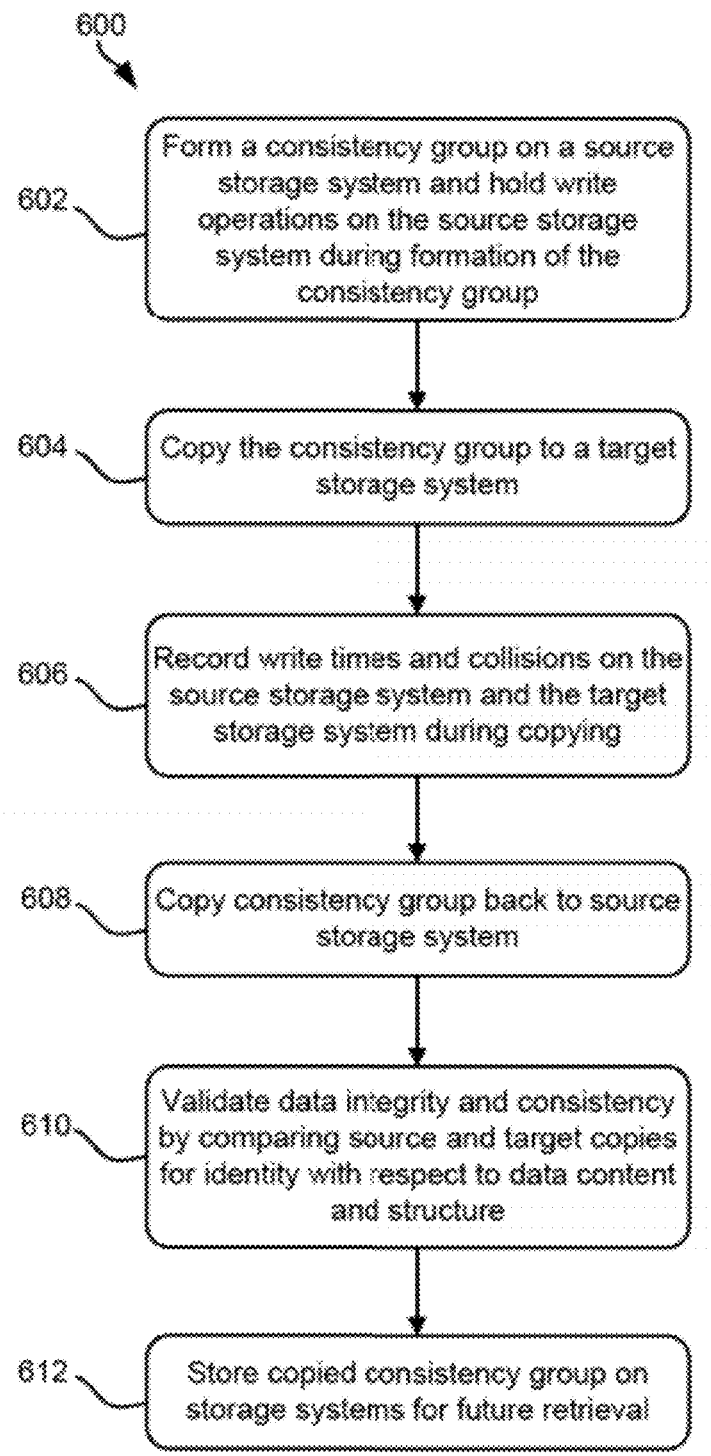
FIG. 6 shows a flowchart of a consistency group formation process on an asymmetrical (asynchronous) configuration, according to one embodiment.

Referring now to FIG. 6, a method 600 for forming a consistency group on a symmetrical (synchronous) configuration is shown, according to one embodiment. The method 600 may be carried out in any desired environment, such as those described in FIGS. 1-2, and many others, as would be known to one of skill in the art. In one preferred embodiment, the method 600 may be carried out by a storage system, such as a source storage system or a target storage system.

Any of the descriptions and embodiments described in reference to FIG. 5 above may be implemented in FIG. 6, according to various embodiments.

In operation 602, a consistency group is formed on a source storage system by holding application writes while creating a bitmap comprising updates for the consistency group being formed on all volumes within the source storage system. In a preferred embodiment, operation 602 may take about 2 ins to about 3 ms, and may have a maximum coordination time of about 50 ins, 60 ms, 70 ins, etc., according to some embodiments, after which the operation may be abandoned.

Subsequently in operation 604, the consistency group (coordinated) is sent to a target storage system via a copy operation. In a preferred embodiment, operation 604 may have maximum consistency group formation time, which forces the operation to be completed in less than a predetermined period of time, such as 1 minute, 30 seconds, 20 seconds, 10 seconds, etc., or else the operation may be abandoned.

In some embodiments, the target storage system may be located in a site remote from the source storage system.

In operation 606, application write operations and collisions are recorded in a separate bitmap for comparison to threshold values and adjacent cycles of copy operations. Operation 606 may be executed in concert with operation 604, in some approaches.

In operation 608, the same consistency group received in operation 604 is copied back to the target storage system.

In operation 610, data integrity and consistency is validated by comparing source and target copies for identity with respect to data content and structure. In this manner, symmetrical comparisons may be made that ensure that each copy of the consistency group is identical on each end of the storage system, and that the stored consistency group copies are identical to the original consistency group formed in operation 602.

In one preferred embodiment, consistency groups which fail validation either in terms of integrity, consistency, or both, may be released for overwrite, and the copy operation may be repeated, e.g., operations 604-608.

Finally, in operation 612, the copied consistency group is stored on each storage system. This allows the consistency group to be retrieved at a future time from either storage system. In one embodiment, future retrieval may be necessitated by, for example, a natural disaster at the source storage system site, destruction of data on the source storage system, etc.

Figure 7:
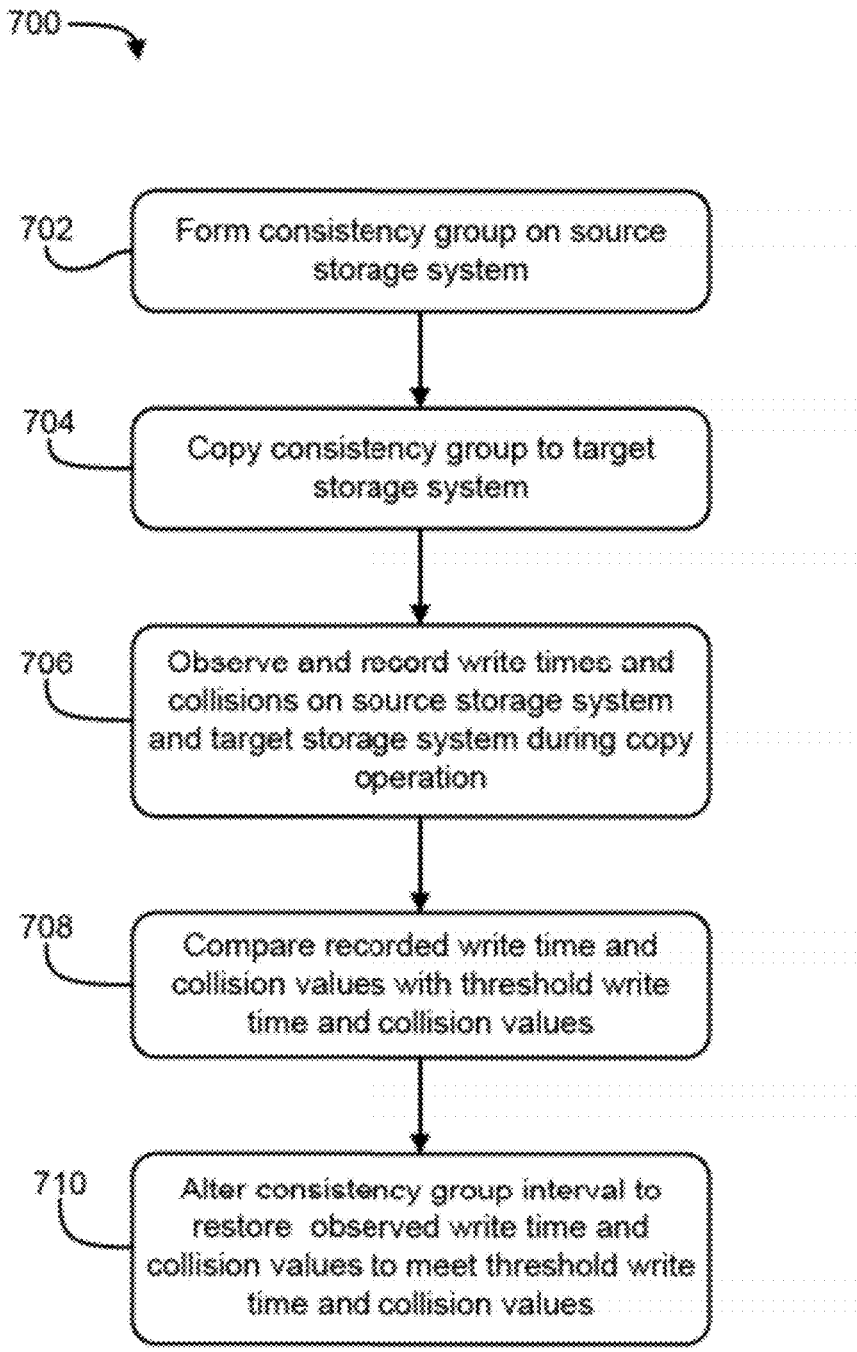
FIG. 7 depicts a flowchart of a process for altering the consistency group interval on an storage system, according to one embodiment.

Referring now to FIG. 7, a method 700 for altering a consistency group interval is shown, according to one embodiment. The method 700 may be carried out in any desired environment, such as those described in FIGS. 1-2, and many others, as would be known to one of skill in the art. In one preferred embodiment, the method 700 may be carried out by a storage system, such as a source storage system or a target storage system.

Any of the descriptions and embodiments described in reference to FIGS. 5-6 above may be implemented in FIG. 7, according to various embodiments.

The consistency group interval is the amount of time the storage system will wait between the formation of each consistency group. The effect of increasing this value will be to increase RPO and can increase efficiency of bandwidth utilization by increasing the number of duplicate updates that occur between consistency groups and do not benefit to be sent from the primary to the secondary disk subsystems However, as it also increases the time between successive Flash-Copies increasing this value is not necessary and may be counter productive in high bandwidth environments as frequent consistency group formation will reduce the overheads of Copy on Write processing. The default for the Consistency Group Interval may be 0 seconds, so the storage system will continuously form consistency groups as fast as the environment will allow. In a preferred embodiment, this parameter remains as the default value, allowing the storage system to form consistency groups as fast as possible given the workload, and the system may automatically cease formation for a period of time if the consistency group formation time is exceeded.

In operation 702, a consistency group is formed on a source storage system by holding application writes while creating a bitmap comprising updates for the consistency group being formed on all volumes within the source storage system. In a preferred embodiment, operation 702 may take about 2 ins to about 3 ins, and may have a maximum coordination time of about 50 ins, 60 ins, 70 ms, etc., according to some embodiments, after which the operation may be abandoned.

One of the key design objectives for one embodiment of the storage system is not to affect the production applications. The consistency group formation process involves the holding of production write activity in order to create dependant write consistency across multiple devices and multiple disk subsystems. This process may therefore be fast enough that an impact is extremely small.

In a preferred embodiment of the storage system, the process of forming a consistency group is designed to take less than about 5 ms, e.g., 1 ins to 3 ins, if the system forms consistency groups every 3 to 5 seconds, then the percentage of production writes impacted and the degree of impact is therefore very small. The example below shows the type of impact that might be seen from consistency group formation in the storage system environment.

In one embodiment, the storage system does not use a cache sidefile in order to avoid the issues with cache filling up that are seen with other asynchronous replication solutions. However, this does have the implication that if updates are made to tracks in a previous consistency group that have not yet been sent then this previous image may need to be protected. This situation is referred to as a collision.

In order to do this, the system may delay the completion of the write until the previous track image has been sent to the secondary disk subsystem. This is preferably done immediately and with the highest priority.

Subsequently in operation 704, the consistency group (coordinated snapshot) is sent to a target storage system via a copy operation. In a preferred embodiment, operation 704 may have maximum consistency group formation time, which forces the operation to be completed in less than a predetermined period of time, such as 1 minute, 30 seconds, 20 seconds, 10 seconds, etc., or else the operation may be abandoned. In some embodiments, the target storage system may be located in a site remote from the source storage system.

In operation 706, application write operations and collisions are recorded in a separate bitmap for comparison to threshold values and adjacent cycles of copy operations. Operation 706 may be executed in concert with operation 704, in some approaches.

In operation 708, the recorded write operations and collisions are compared to threshold values. The threshold values may be default values, user-defined values, dynamically determined values, etc.

In several alternate embodiments, the threshold values may correspond to any of the following: an absolute input/output rate, a change in input/output rate, an absolute number of collisions observed, the rate of collisions per write operation during a given consistency group formation and copy, etc.

In operation 710, where recorded write times or collisions exceed the threshold values, the duration of the consistency group interval may be altered to restore system performance to within a defined performance threshold.

In one embodiment, the consistency group interval may be characterized by an upper bound, represented by a minimum consistency group interval which forces consistency groups to be formed at least a minimum amount of time apart, e.g., consistency groups are not formed more frequently than desired.

In another embodiment, the consistency group interval may be characterized by a lower bound, represented by a maximum consistency group interval which forces consistency groups to be formed at least once every time period, e.g., consistency groups are not formed less frequently than desired.

Previous asynchronous replication solutions have used a cache sidefile to store updates before transmission to the remote site. As a result, they have included pacing mechanisms to slow down production write activity and allow the mirroring to continue if the replication solution falls behind. In one embodiment, storage systems described herein have been designed not to use a sidefile and so they require no pacing mechanism.

In another embodiment, scalability and consistency may be provided across multiple primary and secondary disk subsystems. A replication solution benefit should not be limited to a single primary or secondary disk subsystem, as this may result in an existing solution becoming non-viable if the storage and throughput requirements outgrow the capabilities of a single disk subsystem. Allowing a single consistency group to span multiple disk subsystems also allows different cost storage to exist within the same storage system environment.

Another embodiment may allow for removal of duplicate writes within a consistency group before sending the consistency group to the remote site. Bandwidth is one of the most expensive components of an asynchronous replication solution and minimizing the usage of bandwidth can provide significant cost savings for a replication solution. If multiple updates are made to the same piece of data within a consistency group then only the latest update benefit be sent. Depending on the access patterns of the production workload, significant savings might be seen in the bandwidth required for the solution.

In another embodiment, consistency may be provided between different platforms, particularly between embodiments described herein and open systems. With the increase in applications spanning multiple servers and platforms, there is a need to be able to provide a consistent asynchronous replication solution that can handle workloads from multiple servers, and specifically for both IBM emit key data (CKD) (according to one embodiment) and FreeBASIC (FB) data in open systems, and the like. A storage system can be used on any devices that are defined on the disk subsystem, including UNIX/Windows workloads.

For the most intensive write workloads, such as log volumes, updates may be performed in a sequential fashion and the same piece of data is not updated on a regular basis. However even for less intensive workloads, a collision for a particular track will only occur once for each consistency group. Thus, the synchronous overhead is only seen once per consistency group. Considerable analysis was performed on the potential impact of collisions for such datasets and it was determined that a very small percentage of the writes would experience collisions and so, similar to the impact of consistency group formation, this effect would be very small.

In one embodiment, there are two stages to the recovery of a storage system environment. The first stage is to check the exact status of the storage system at the time of the outage. Depending on where the storage system was in the consistency group formation process at the time of the failure event there may be actions required to ensure that the copy is consistent.

If the storage system environment was part way through the FlashCopy process when the failure occurred then this is similar to an in-flight transaction in a database environment. If the commit process has not yet started then the system may revert the FlashCopy to back out the consistency group and if the commit process has started, the system may complete this process to commit the consistency group. 1) Commit/revert FlashCopy relationships if required. The second stage is to recover the environment and enable production systems to be restarted on the backup devices and prepare for a potential return to the primary site. This is performed with the following process: (2) failover the backup devices. This will place the backup devices in a primary suspended state and will allow for a resynchronization of the Global Copy relationship to be performed in order to return to the primary site assuming the primary disk subsystem has survived. (3) Fast Reverse Restore the FlashCopy relationship with the secondary backup devices. This will restore the latest consistency group to the B devices and will start a background copy for those tracks that have been modified since the latest consistency group. (4) FlashCopy from the backup devices to the secondary backup devices to save an image of the last consistency group. This step is optional but preserves an image of the production devices at the recovery point in case this might be required. 5) Restart Production systems.

The storage system may be embodied in several configurations, including symmetrical, asymmetrical, point-in-time, and etc.

In embodiments deploying an asymmetrical configuration, the storage system can only be used from the primary site to the recovery site. This type of configuration would be typical for a disaster recovery configuration where the production systems would run in the secondary location only if there was an unplanned outage of the primary location. Once production workloads are moved to the recovery site then Global Copy may be used to return to the primary site. As no disaster recovery capability would be provided in the reverse direction it is unlikely that in this type of configuration the system would choose to run for extended periods of time in the secondary location unless forced to by unavailability of the primary site. As the storage system uses two copies of data in the secondary location there would be twice as many physical drives in this location as in the production location if the same size drives were used. In some situations, it may be cost effective to use larger drives in the secondary location. Spreading the production data over all these drives should provide equivalent performance in a disaster situation while reducing the overall cost of the solution.

In one embodiment with a symmetrical configuration, the system may also supply additional disk capacity for FlashCopy in the primary site. This could also be used for regular FlashCopy, for example for backing up the data without extended outages for the production systems.

In another embodiment, it is possible to setup the storage system to form a consistency group in a controlled fashion to take a regular but infrequent Point in Time copy of the production workload in a remote location. This might be used to provide an RPO of 6/12/24 hours or to provide a consistent copy of data at particular points relative to business and application activity. When running in this fashion the normal mode of operation would be running with the storage system paused. Global Copy will be sending data from the primary to the secondary disk subsystems ensuring that the difference between primary and secondary is kept to the minimum. When an update of the consistent copy of data on the secondary disk subsystem is required the storage system is resumed and is left running until a single consistency group has formed. The storage system is configured with a large consistency group interval to ensure the system only form a single consistency group and will then return to running in Global Copy mode. As soon as the consistency group is formed the storage system should be paused to prevent the formation of further consistency groups.

As the cost of telecommunications decreases businesses are looking to implement disaster recovery solutions at longer and longer distances. Intercontinental distances are becoming more common and replication solutions may be able to support these distances Distance can affect replication solutions both by increasing the RPO and by decreasing the throughput. As an asynchronous replication solution the storage system is designed to operate at long distances but as distances grow extremely large there is some impact that will be experienced.

In one embodiment, sending large amounts of data at long distances in enabled by a significant degree of parallelism, to ensure that the bandwidth can be filled. If there is not enough parallelism then the throughput will be reduced as more and more time is spend waiting for acknowledgements indicating that data has been received at the remote location. However at shorter distances the same degree of parallelism may be counter-productive.

In one embodiment, the storage system provides an extreme distance RPQ for environments where the distance/latency between the local and remote sites is over 5000 km. The affect of distance is felt more for smaller updates as the bandwidth is less likely to be the bottleneck than for larger updates.

The maximum consistency group formation impact is defined in terms of the average percentage by which write performance will be impacted. In other words, a user defined acceptable impact of 10% would mean that, on average, the write performance of the application would be 90% of what it could achieve if it was running without collisions caused by consistency group formation. This number is converted internally and stored as the number of acceptable collisions per write.

According to another embodiment, the consistency group interval may be determined based on some equations. In the following equations, X, maximum impact %, is the maximum consistency group formation impact to writes defined by the user when the system relationship is created; A, AverageNormalWriteTime (sec), is the average response time when no collision is hit, and is set depending on the hardware being accessed, e.g., Solid State Drive (SSD) vs. Hard Disk Drive (HDD) using Parallel Advanced Technology Attachment (PATA) vs. HDD using Serial Advanced Technology Attachment (SATA), etc; B, AverageCollisionWriteTime (sec), is the average response time when a collision is hit and may be computed using average response time of secondary as the distance is not known a-priori; Y, acceptable collisions/write, is the maximum acceptable collisions per write used by microcode that will meet the maximum impact % specified by the user.

In one embodiment, $$X=(\text{AcceptableResponseTimeWithCollisions}-A)/A$$

where:

$$\text{AcceptableResponseTimeWithCollisions}=(A*(1-Y))+(B*Y)$$

therefore:

$$X=((A*(1-Y))+(B*Y)-A)/A.$$

solving for Y results in:

$$AX=(A*(1-Y))+(B*Y)-A$$

$$AX=A-AY+BY-A$$

$$AX=BY-AY$$

$$AX=Y*(B-A)$$

$$AX/(B-A)=Y$$

$$X*(A/(B-A))=Y$$

Therefore, rewriting the above equation in terms of the original variables results in:

acceptable collisions/write=maximum impact %*(AverageNormalWriteTime/(AverageCollisionWriteTime−AverageNormalWriteTime)).

This equation may be used to determine an acceptable collisions/write for any storage system or group of storage systems.

Figure 8:
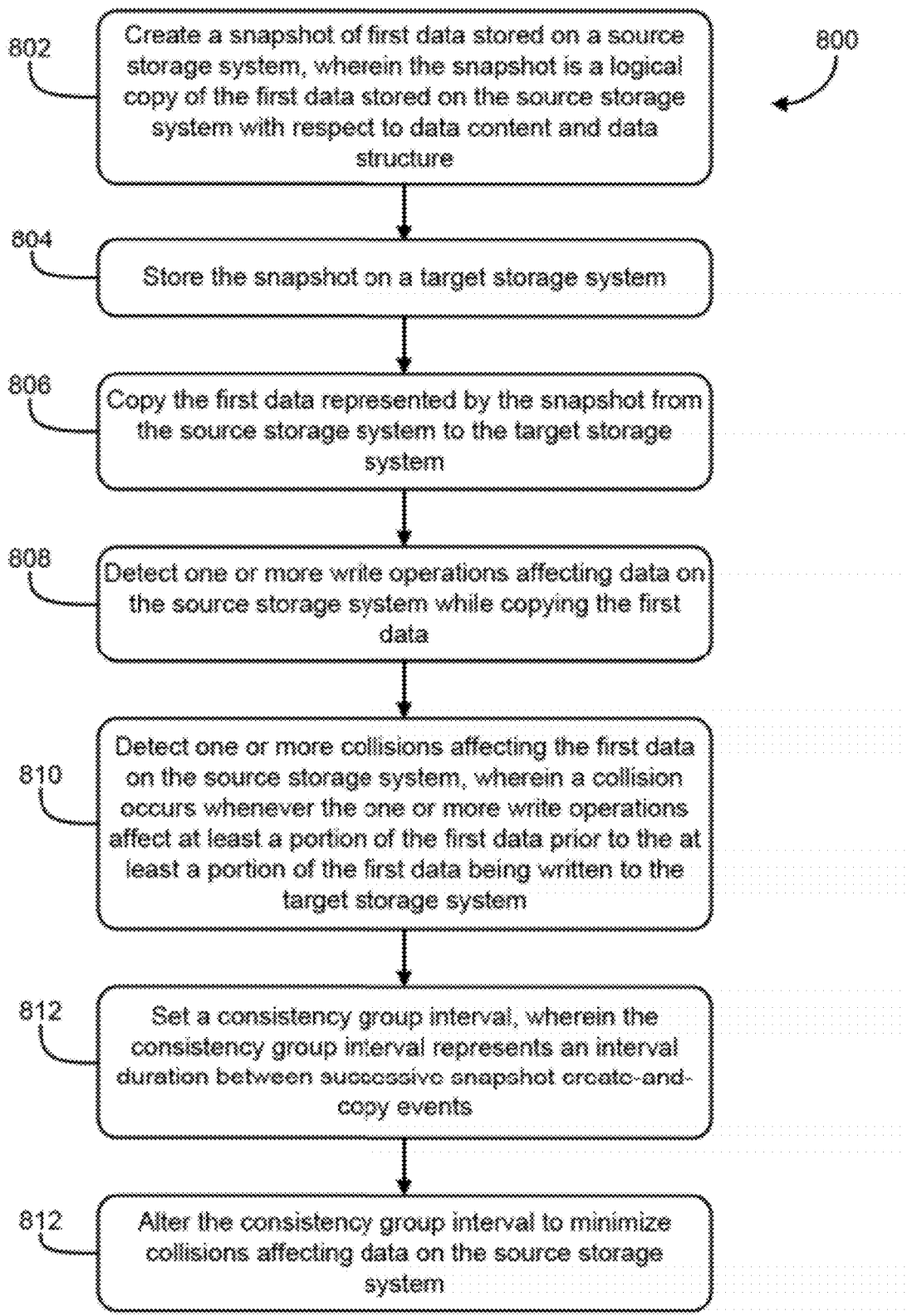
FIG. 8 shows a flowchart of dynamic consistency group formation, according to one embodiment.

Now referring to FIG. 8, a method 800 for dynamic consistency group formation is shown according to one embodiment. The method 800 may be carried out in any desired environment, including those described in FIGS. 1-2. In addition, the method 800 may make use of any of methods 500, 600, and 700, and embodiments and/or approaches thereof, described in FIGS. 5-7.

In operation 802, a snapshot of first data stored on a source storage system is created. The snapshot is a logical copy of the first data stored on the source storage system with respect to data content and data structure. The first data may be all or any portion of any data stored on the source system or on multiple source systems, according to various embodiments.

In operation 804, the snapshot is stored on a target storage system. The target system may be remote from the source system, and may be of any type known in the art.

In operation 806, the first data represented by the snapshot is copied from the source storage system to the target storage system. This provides for an exact copy of the first data, as it appeared on the source storage system when the snapshot was produced, to be copied to the target storage system, thereby providing for a point in time data capture.

In operation 808, one or more write operations affecting data on the source storage system are detected while copying the first data. The write operations to be detected may write over, delete, change, or otherwise access the first data or any portion thereof.

In operation 810, one or more collisions affecting the first data on the source storage system are detected. In one embodiment, a collision occurs whenever the one or more write operations affect at least a portion of the first data prior to the at least a portion of the first data being written to the target storage system.

In operation 812, a consistency group interval is set, wherein the consistency group interval represents an interval duration between successive snapshot create-and-copy events. After the consistency group interval is set, successive snapshots may be produced after the consistency group interval has passed. Of course, as the consistency group interval is modified, the snapshots may be produced more or less frequently to adhere to the consistency group interval.

In operation 814, the consistency group interval is altered to minimize collisions affecting data on the source storage system. Any method of altering the consistency group interval may be used, as described herein according to various embodiments, or as would be apparent to one of skill in the art upon reading the present descriptions.

According to one embodiment, the method 800 may include measuring a latency of one or more performed operations on at least one of the storage systems, wherein the latency is a period of time required to perform the one or more operations; wherein the consistency group interval is altered to ensure that the latency does not exceed a maximum latency. Further, in some approaches, the latency may be determined based on a value, such as: an absolute input-output (I/O) rate, a change in input-output (I/O) rate, an absolute number of collisions, a rate of collisions per write operations, etc., or any other value as would be apparent to one of skill in the art upon reading the present descriptions.

In another embodiment, the method 800 may include copying second data that is affected by a collision from the source storage system to the target storage system before performing a write operation on the second data stored to the source storage system. In this way, latency may be reduced since write operations will not be delayed to wait for copying operations to complete.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for dynamic consistency group formation, the method comprising:
   creating a snapshot of first data stored on a source storage system, wherein the snapshot is a logical copy of the first data stored on the source storage system with respect to data content and data structure;
   storing the snapshot on a target storage system;
   copying the first data represented by the snapshot from the source storage system to the target storage system;
   detecting one or more write operations affecting data on the source storage system while copying the first data;
   detecting one or more collisions affecting the first data on the source storage system, wherein a collision occurs whenever the one or more write operations affect at least a portion of the first data prior to the at least a portion of the first data being written to the target storage system;
   setting a consistency group interval, wherein the consistency group interval represents an interval duration between successive snapshot create-and-copy events;
   altering the consistency group interval to minimize collisions affecting data on the source storage system; and
   measuring a latency of one or more performed operations on at least one of the storage systems, wherein the latency is a period of time required to perform the one or more operations; wherein the consistency group interval is altered to ensure that the latency does not exceed a maximum latency.

2. The method recited in claim 1, wherein the target storage system is remote from the source storage system.

3. The method recited in claim 1, wherein the latency is determined based on a value selected from a group consisting of: an absolute input-output (I/O) rate, a change in input-output (I/O) rate, an absolute number of collisions, and a rate of collisions per write operations.

4. The method recited in claim 1, wherein the consistency group interval is determined based on a maximum duration between successive snapshot create-and-copy events.

5. The method recited in claim 1, wherein the consistency group interval is determined based on a minimum duration between successive snapshot create-and-copy events.

6. The method recited in claim 1, further comprising copying second data that is affected by a collision from the source storage system to the target storage system before performing a write operation on the second data stored to the source storage system.

* * * * *